Patented Apr. 28, 1936

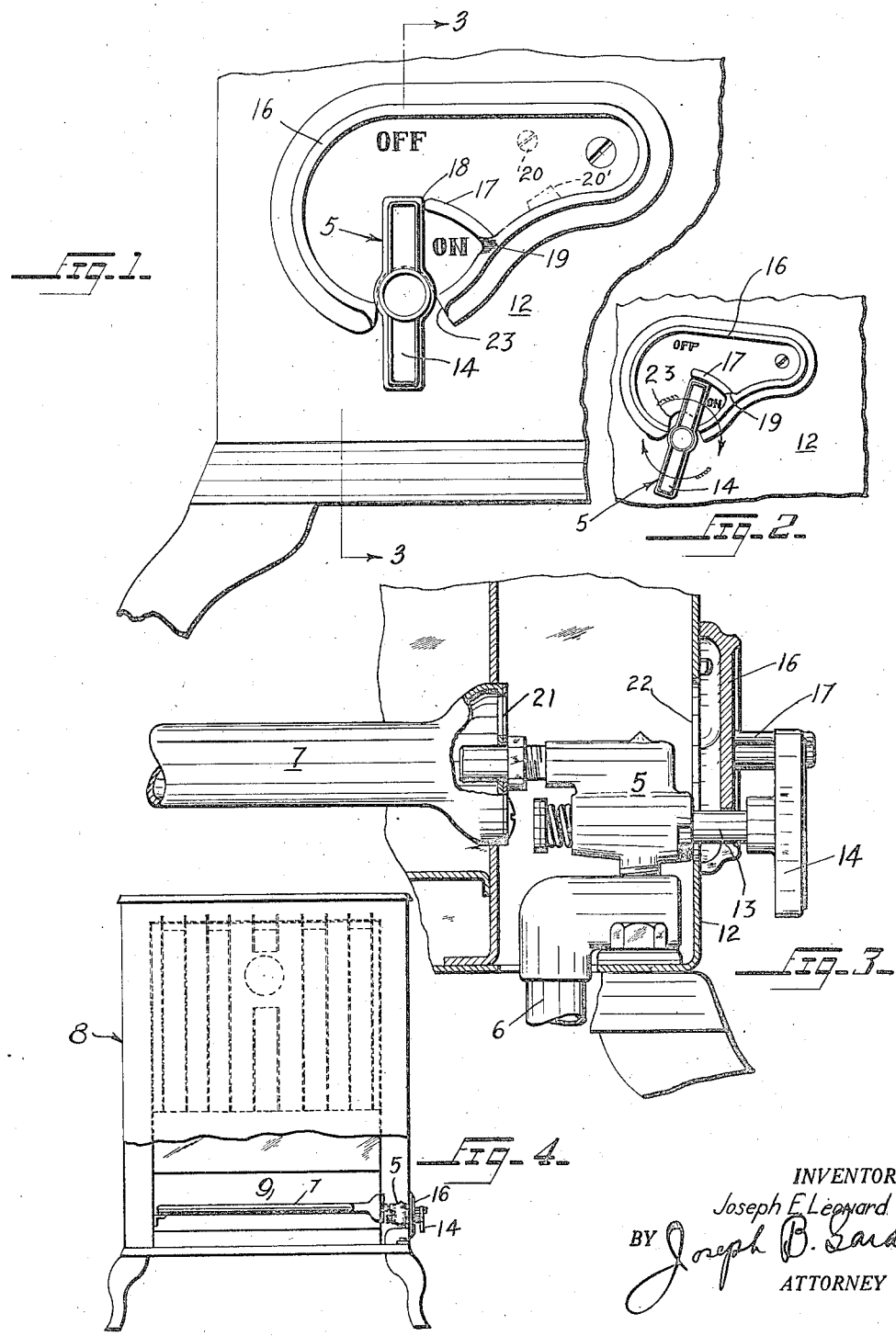

2,039,011

UNITED STATES PATENT OFFICE 2,039,011

SAFETY LOCK FOR GAS COCKS

Joseph E. Leonard, Oakland, Calif., assignor to Hammer-Gray Company, Oakland, Calif., a corporation of California Application January 17, 1931, Serial No. 509,339

4 Claims. (Cl. 126—42)

The invention relates to a means on a gas stove or heater for preventing the control handle of the gas cock from being accidentally turned, whereby the gas may escape unnoticed.

An object of the invention is to provide a means of the character described which will serve to automatically lock the gas cock handle in closed position when the handle has been turned to cut off the gas supply.

Another object of the invention is to provide a means with the foregoing advantage, which will not interfere with the handle in moving same from open to closed position or for moving the handle from closed to open position after the locking means has been displaced.

Another object of the invention is to provide a locking means of the character described which will serve in connection with the casing of the stove or heater to conceal the gas cock arranged to be controlled thereby, but which may be readily displaced to give full access to the burner air-regulating means associated with the valve for adjusting same.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a front view of a portion of a heater with the locking means of my invention operatively holding the gas-cock handle in closed position.

Figure 2 is a view similar to Figure 1 but on a smaller scale, showing the locking member displaced as when the handle is in other than closed position.

Figure 3 is a vertical sectional view of the parts shown in Figure 1, the plane of the section being indicated by the line 3—3 of said figure.

Figure 4 is a front view, partly in section, of a heater equipped with the locking means.

As illustrated in the drawing, the safety lock of my invention is applied to a gas-cock 5 which controls the flow of gas from a supply connection 6 to a burner 7. In the present instance the cock and burner are disposed in a circulating gas-heater 8, the burner being arranged in a combustion chamber 9, while the cock is located between one of the walls of such chamber and the casing wall 12 of the heater.

As clearly shown in Figure 3, the spindle 13 of the cock extends through the wall 12 of the heater with the control handle 14 of the cock located on the outer side of said wall. Pivotally mounted on the wall 12 at one side of the handle 14 and adapted to lie between the wall and handle is a lever 16 which is arranged for cooperation with the handle to hold same against accidental turning when in closed position. In the present embodiment, in the closed position of the handle, the lever is adapted to rest upon the spindle 13, and means are provided on the lever, such as a projection 17, which is arranged in said position of the handle, to lie in the path of the handle to prevent movement thereof from closed position. The cock is here arranged to be in closed position when the handle is vertically disposed, and as clearly shown in Figure 1, when the handle is so positioned the lever will rest upon the spindle and the forward end of the projection 17 will substantially abut against the side 18 of the handle which leads when the latter is moved to open the cock. In this manner it will be clear that in order to move the cock to open position, the lever must be first raised and the projection 17 held sufficiently elevated to clear the handle, as indicated in Figure 2. After the handle has been started on its forward movement, the projection will not interfere therewith and the handle may be turned at will.

When the cock is open, such as when the handle has been turned forwardly about 90 degrees, and it is desired to return the cock to closed position, the handle is merely turned back to vertical, the rear end 19 of the projection 17 being beveled or otherwise formed so that upon engagement therewith of the returning handle the lever will be raised to allow the handle to be turned back until the cock is closed. As soon as the handle reaches its vertical disposition and the cock thereby closed, the lever will drop and rest upon the spindle, and the projection will again lie in the path of the handle to prevent the turning to open position. It will be understood that, as is usual with gas cocks of the type here used, rearward movement of the handle beyond the closed position is prevented by suitable means incorporated with the cock. It will thus be seen that when the handle is vertically disposed, movement thereof in any direction is effectively prevented and any danger of the cock being accidentally opened will be practically entirely eliminated. In order to prevent the lever from being swung out of operative association with the handle, a stop 20 is provided on the casing and is engageable by a shoulder 20' on the lever to limit the upward displacement of the lever.

Since substantially all parts of the cock, as well as the air regulating member 21 of the burner, are confined between the walls of the combustion chamber and casing, suitable access thereto should be provided from the exterior of the heater. As shown, such access is effectively provided for by means of an ample sized opening 22 formed in the casing and registering with the cock and member 21. Preferably the spindle extends through said opening and the latter is large enough not only to give free access to the regulator, but to permit the insertion or removal of the cock therethrough. As the lever 16 is normally in proximity to the cock-spindle and handle, and therefore to the opening 22, advantage is taken of this fact to provide in connection with the lever a means of normally covering said opening and thereby fully concealing the cock and adjacent parts. This is simply done by making the lever, as clearly shown in the drawing, of such size and form as to engage and cover said opening when operatively associated with the handle. Preferably the lever is formed with a recess 23 in which the spindle engages and which permits the lever to more effectively cover the opening. With the lever thus formed there is also sufficient space for advantageously displaying thereon suitable indicia such as the words "off" and "on" for guiding the operator in the use of the handle.

It will now be clear that the means of my invention is well adapted to the accomplishment of the objects hereinbefore referred to.

I claim:

1. The combination with a stove casing having contained therein a burner with an air regulator and a cock for controlling the flow of gas to said burner, an operating handle for said cock positioned outside of and spaced from said casing, said casing having adjacent said handle an opening for according access to said regulator from the exterior of the casing, and a manually releasable lever mounted intermediate said casing and handle for locking said handle against movement when the valve is in locked position and providing a closure for said opening to conceal the cock.

2. In combination with a burner cock disposed at the inner side of stove casing and an actuator spindle for said cock and extending therefrom through and without said casing and a control handle on said spindle exteriorly of said casing, of a plate pivoted to said casing adjacent said spindle biased toward lowered position and arranged to be supported when in a lowered position on said spindle, and a projection on said plate above said spindle and having the under side thereof substantially arcuately curved thereabout and arranged for engagement with an outermost end of said handle, the radial distance of said projection side from said spindle being less than that of said handle end when said plate is in lowered position whereby on engagement of said handle end with said projection side said plate will be arcuately elevated about its pivotal connection with the casing and upon movement of said handle to cock closing position and from under the end of said projection said plate will gravitate to lowered position to dispose said projection end against said handle to prevent the latter's return movement to open said cock.

3. The combination of a stove casing having contained therein a burner with an air regulator and a cock for controlling the flow of gas to the burner, said casing having adjacent said cock and regulator an opening affording access to said regulator, an actuator spindle for and extending from said cock through said opening and without said casing, a control handle on said spindle exteriorly of said casing and a plate pivoted to said casing adjacent said spindle in covering relation to said opening and biased toward lowered position, and a projection on said plate arranged for engagement with said handle and having a side thereof above and substantially arcuately disposed with respect to said spindle and of a radius therefrom less than that of an outermost end of said handle whereby on engagement of said handle end with said projection side said plate will be arcuately elevated about its pivotal connection with the casing and upon movement of said handle from under the end of said projection said plate will gravitate to position said projection end against said handle to prevent the latter's return movement.

4. A combination with a stove casing having contained therein a burner with an air regulator and cock for controlling the flow of gas to said burner, an operating handle for said cock positioned outside of said casing, said casing having adjacent said handle an opening for affording access to said regulator from the exterior of the casing, and a plate pivoted off center to said casing to normally rest on and lock said handle when the latter is moved to close said cock, said plate in said position providing a closure for said opening to conceal the cock and being normally liftable to a raised position uncovering said opening or to an intermediate raised position still covering said opening but releasing said handle for turning.

JOSEPH E. LEONARD.

CERTIFICATE OF CORRECTION.

Patent No. 2,039,011.    April 28, 1936.

JOSEPH E. LEONARD.

It is hereby certified that the name of the assignee in the above numbered patent was erroneously written and printed as "Hammer-Gray Company" whereas said name should have been written and printed as Hammer-Bray Company, of Oakland, California, a corporation of California, as shown by the records of assignments in this office; and that the said Letters Patent should be read with this correction therein that the same may conform to the record of the case in the Patent Office.

Signed and sealed this 22nd day of September, A. D. 1936.

Henry Van Arsdale

Acting Commissioner of Patents.

(Seal)